United States Patent
Ogata et al.

(10) Patent No.: US 7,236,864 B2
(45) Date of Patent: Jun. 26, 2007

(54) ROLLOVER JUDGING DEVICE

(75) Inventors: Yoshihisa Ogata, Chiryu (JP); Seiya Ide, Okazaki (JP)

(73) Assignee: DENSO Corporation, Kariya (JP)

( * ) Notice: Subject to any disclaimer, the term of this patent is extended or adjusted under 35 U.S.C. 154(b) by 43 days.

(21) Appl. No.: 11/016,931

(22) Filed: Dec. 21, 2004

(65) Prior Publication Data
US 2005/0159864 A1    Jul. 21, 2005

(30) Foreign Application Priority Data
Jan. 16, 2004   (JP)   ............... 2004-009188

(51) Int. Cl.
*B60R 21/00* (2006.01)
(52) U.S. Cl. .......................... 701/38; 701/46
(58) Field of Classification Search ...................... None
See application file for complete search history.

(56) References Cited

U.S. PATENT DOCUMENTS 5,925,084 A     7/1999  Gotoh et al.
6,282,474 B1 *  8/2001  Chou et al. ................ 701/45
6,826,468 B2 * 11/2004  Williams .................... 701/70
2002/0087235 A1 *  7/2002  Aga et al. ................... 701/1
2002/0173882 A1 * 11/2002  Tobaru et al. .............. 701/1

FOREIGN PATENT DOCUMENTS

JP        2001-260780     *  9/2001

* cited by examiner

*Primary Examiner*—Michael J. Zanelli
(74) *Attorney, Agent, or Firm*—Oliff & Berridge, PLC

(57) ABSTRACT

In a rollover judging device for a vehicle, an acceleration differential value of an acceleration of a vehicle in a lateral direction is calculated. And a roll angle of the vehicle is calculated from a roll rate. Then, the acceleration differential value is compared with a predetermined value corresponding to respective roll angles, to judge a trip-type rollover of the vehicle.

17 Claims, 5 Drawing Sheets

ROLLOVER JUDGING DEVICE

CROSS REFERENCE TO RELATED APPLICATION

This application is based on Japanese Patent Application No. 2004-9188 filed on Jan. 16, 2004, the disclosure of which is incorporated herein by reference.

FIELD OF THE INVENTION

The present invention relates to a rollover judging device for judging a possible rollover of a vehicle and driving a passenger protecting device such as a curtain air bag device, a seat belt pretension device or the like.

BACKGROUND OF THE INVENTION

A rollover judging device judges a possible rollover of a vehicle on the basis of a roll rate (RR, an angular velocity) when a vehicle is rolled and a roll angle (RA, a roll angle) achieved by integrating the roll rate (for example, see JP Patent Publication No. H9-240399). FIG. 5 shows a map for the judgment of rollover. In FIG. 5, a point A represents a stationary rollover limit angle. The stationary rollover limit angle means an angle, at which a vehicle would surely rollover under a stationary state if the vehicle is further inclined.

In FIG. 5, a line $A_{th}$ represents a dynamic rollover limit threshold value. The line $A_{th}$ is calculated from the balance between the rotational kinetic energy and the positional energy at the rolling time. FIG. 6 is a schematic diagram showing a state where the vehicle rolls around a starting point O. Here, the inertial moment is represented by I, the angular velocity at the rolling time is represented by $\omega$, the mass of the vehicle is represented by m, the acceleration of gravity is represented by g, the difference in height between the position of the center of gravity G2 after the rolling of the vehicle and the position of the center of gravity G1 before the rolling of the vehicle is represented by $\Delta h$, the distance from the starting point O to the center-of-gravity position G1 is represented by r, the shift angle of the center of gravity at the rolling time is represented by $\theta$, and the angle defined by the road surface H, the starting point O and the center-of-gravity position G1 (i.e., the intersecting angle between the road surface H and a line passing through the starting point O and the center-of-gravity position G1) is represented by $\phi$.

When the roll of the vehicle reaches the stationary limit angle and when the kinetic energy $E1$ $(=mg\Delta h=mgr(1-\sin(\theta+\phi)))$ exceeds the positional energy $E2$ $(=I\omega^2/2)$, it is estimated that the vehicle would rollover insofar as no external force other than g is applied to the vehicle.

The dynamic rollover limit threshold value $A_{th}$ is set on the basis of the energy balance described above. In FIG. 5, in the case of a lower left area from the dynamic rollover limit threshold value $A_{th}$, the vehicle does not rollover even when it rolls. However, in the case of an upper right area from the dynamic rollover limit threshold value $A_{th}$, the vehicle rolls over. The rollover judgment of vehicles has been hitherto carried out on the basis of the RR-RA map as described above. The curtain air bag device, the seat belt pretension device, etc. are driven on the basis of the above judgment.

The vehicle rollover type is classified into flip-over, fall-over, trip-over, etc. The flip-over type is such a rollover type that one wheel of a vehicle goes upon a convex-shaped obstacle such as a curb store or the like when the vehicle travels, so that the vehicle rolls over. Contrarily, the fall-over type is such a rollover type that one wheel of a vehicle falls into a recess obstacle such as a groove or the like when the vehicle travels, so that the vehicle rolls over. In the case of these rollover types (hereinafter referred to as "normal type"), the judgment of the rollover can be performed by the conventional rollover judgment as described above.

The trip-over type is such a rollover type that a vehicle rolls over after the vehicle sideslips. In the case of this rollover type (hereinafter referred to as "trip type"), passengers in a vehicle are moved by acceleration in the lateral direction of the vehicle, and thus the passengers are proximate to the interior members of the vehicle (for example, pillars, window glass, etc.). Therefore, it is necessary to make a driving instruction to a passenger protection device at an earlier stage than the normal type rollover. In other words, in the case of the trip type rollover, a response required time (even when the passenger protection device is driven after the response required time has elapsed, it is difficult to protect the passengers) is shorter than in the case of the normal type rollover.

According to the conventional rollover judgment (the above-described map of FIG. 5), when the rollover type of a vehicle is the trip type, it has been hitherto difficult to complete the rollover judgment in time for the response required time. That is, the response required time is located in the lower left area from the dynamic rollover limit threshold value $A_{th}$. That is, at the roll time of the vehicle, the vehicle condition exceeds the dynamic rollover limit threshold value $A_{th}$ after the response required time has elapsed.

SUMMARY OF THE INVENTION

The present invention has been implemented in view of the foregoing problem, and has an object to provide a rollover judging device which can promptly make a rollover judgment even when the rollover type of a vehicle is a trip type.

According to one of features of the present invention, a trip-over in which a vehicle rolls over after the vehicle sideslips can be judged. A rollover judging device comprises, for that purpose, a differential value calculating unit for differentiating an acceleration of the vehicle in the lateral direction to calculate an acceleration differential value, and a trip-type rollover judging unit for making a rollover judgment on the basis of a roll angle of the vehicle and the acceleration differential value, so that a possible trip-over of the vehicle can be judged.

That is, the rollover judging device of the present invention makes the rollover judgment by using the acceleration differential value in the lateral direction of the vehicle. Increase/reduction of the acceleration can be grasped by using the acceleration differential value. That is, a future acceleration can be estimated. Therefore, according to the rollover judging device of the present invention, even when the rollover type of the vehicle is the trip type, the rollover judgment can be promptly made.

According to another feature of the present invention, the trip-type rollover judging unit of the rollover judging device further comprises a trip type judging circuit for judging whether the rollover type of the vehicle is the trip type, on the basis of the roll angle and the acceleration, and a mode judging circuit for making a rollover judgment in conformity with the mode of the trip type, on the basis of the roll angle and the acceleration differential value.

When the vehicle sideslips, an acceleration occurs in the lateral direction of the vehicle. Furthermore, when the vehicle rolls, a roll rate and a roll angle occur. Accordingly, when the rollover type of the vehicle is the trip type, the acceleration in the lateral direction of the vehicle, the roll rate and the roll angle occur. By using these parameters, the trip type judging circuit judges whether the rollover type is the trip type or not.

The trip type contains two modes of a hard trip mode and a soft trip mode. The hard trip mode is a mode in which a vehicle rolls over because it trips up a hard material such as a curb stone or the like after the vehicle sideslips. On the other hand, the soft trip mode is a mode in which a vehicle rolls over because it trips up a soft material after the vehicle sideslips, or a vehicle rolls over after it sideslips at a place having relatively high friction coefficient such as sand area or the like.

For example, in the case of the hard trip mode, a high acceleration occurs at a small roll angle, or both a large roll rate and a high acceleration occur at a small roll angle. On the other hand, in the case of the soft trip mode, a low acceleration occurs at a large roll angle, or both of a small roll rate and a low acceleration occurs at a large roll angle. As described above, the correlation of the roll angle, the roll rate and the acceleration is varied in accordance with the mode of the trip type.

By paying attention to the correlation of the roll angle, the roll rate and the acceleration, the mode judging circuit judges whether the trip type is the hard trip or soft trip. Then, the rollover judgment is carried out in conformity with each mode by using the acceleration differential value. For example, under a predetermined condition of each mode, when the acceleration has an increasing tendency, it is judged that the vehicle will roll over. On the other hand, when the acceleration has a decreasing tendency, it is judged that the vehicle will not rollover. According to the above construction, the rollover judgment can be performed in conformity with the mode of the trip type.

According to a further feature of the present invention, a speed calculating unit can be provided in the rollover judging device for integrating the acceleration to calculate a speed. The kinetic energy when the vehicle sideslips is converted to rotational kinetic energy. The speed thus calculated is used for the trip type judgment in the trip type judging circuit, for example. Alternatively, it is used for the mode judgment in the mode judging circuit. According to the above feature, the precision of the rollover judgment is enhanced.

According a further feature of the present invention, the differential value calculating unit starts the calculation of the acceleration differential value after the trip type judging circuit judges the trip type. In the case of the hard trip, a high acceleration occurs at a small roll angle. Therefore, the calculation of the acceleration differential value may be started after both the small roll angler and the high acceleration are satisfied.

On the other hand, in the case of the soft trip, a low acceleration occurs at a large roll angle. Therefore, the calculation of the acceleration differential value may be started after both the large roll angle and the low acceleration are satisfied.

As described above, the condition for starting (needing) the calculation of the acceleration differential value is different in accordance with the mode of the trip type. In consideration of this, the rollover judging device of the present invention determines the start point of the calculation of the acceleration differential value on the basis of the roll angle, the roll rate, the acceleration, etc. According to this feature, it is not required to sequentially continue the calculation of the acceleration differential value.

According to a further feature of the present invention, the differential value calculating unit may be constructed by a high pass filter or differential calculator. According to this construction, the acceleration differential value can be calculated relatively simply and at relatively low cost.

According to a further feature of the present invention, the rollover judging device further comprises a normal type rollover judging unit for making a rollover judgment on the basis of the roll rate and the roll angle of the vehicle. According to the present invention, when the rollover type is a normal type, the rollover judgment is carried out in the normal type rollover judging unit. On the other hand, when the rollover type is a trip type, the rollover judgment is carried out in the trip type rollover judging unit. Accordingly, the rollover judgment can be carried out with high precision in conformity with the roll type.

According to a further feature of the present invention, the rollover judgment of the normal type rollover judging unit and the rollover judgment of the trip type rollover judging unit may be subjected to AND processing. That is, the rollover judgment of the normal type rollover judging unit is used as guard means for the rollover judgment of the trip type rollover judging unit. According to the above feature, the passenger protection device is driven only when both the rollover judging units judge that a vehicle will rollover. Accordingly, malfunction of the passenger protection device can be suppressed.

According to a still further feature of the present invention, a judgment threshold value for the rollover judgment of the normal type rollover judging unit may be changed by the trip type rollover judging unit. That is, a dynamic rollover limit threshold value $A_{th}$ is changed on the basis of the judgment of the trip type rollover judging unit. In other words, the dynamic rollover limit threshold value $A_{th}$ of an RR-RA map is corrected by the acceleration differential value. As a result, the rollover judgment can be performed promptly.

According to a further feature of the present invention, the trip type rollover judging unit may make a rollover judgment by using an acceleration in the vertical direction of the vehicle. At the roll time, an acceleration in the vertical direction of the vehicle occurs. According to this feature, the rollover judgment can be further performed with higher precision.

According to a still further feature of the present invention, the rollover judging device makes the rollover judgment on the basis of a map achieved by combining at least two parameters of a roll rate, a roll angle, an acceleration in the lateral direction of a vehicle and an acceleration differential value achieved by differentiating the acceleration, wherein at least one of the acceleration and the acceleration differential value is contained in the combined two parameters.

As described above, the conventional rollover judging device makes a rollover judgment on the basis of a two-dimensional map of RR-RA. On the other hand, the rollover judging device of this invention makes a rollover judgment on the basis of a map containing at least one of the acceleration and the acceleration differential value (for example, three-dimensional map of GY (acceleration in the lateral direction of the vehicle)-RR-RA). According to the rollover judging device of the present invention, the rollover judgment can be made with higher precision as compared with the conventional rollover judgment.

According to the present invention, a rollover judging device is realized, which can perform a rollover judgment promptly even when the rollover type of the vehicle is the trip type.

BRIEF DESCRIPTION OF THE DRAWINGS

The above and other objects, features and advantages of the present invention will become more apparent from the following detailed description made with reference to the accompanying drawing.

In the drawing.

DETAILED DESCRIPTION OF THE PREFERRED EMBODIMENTS

Preferred embodiments according to the present invention will be described hereunder with reference to the accompanying drawings.

First Embodiment

First, the construction of a rollover judging device according to this embodiment will be described.

Figure 1:
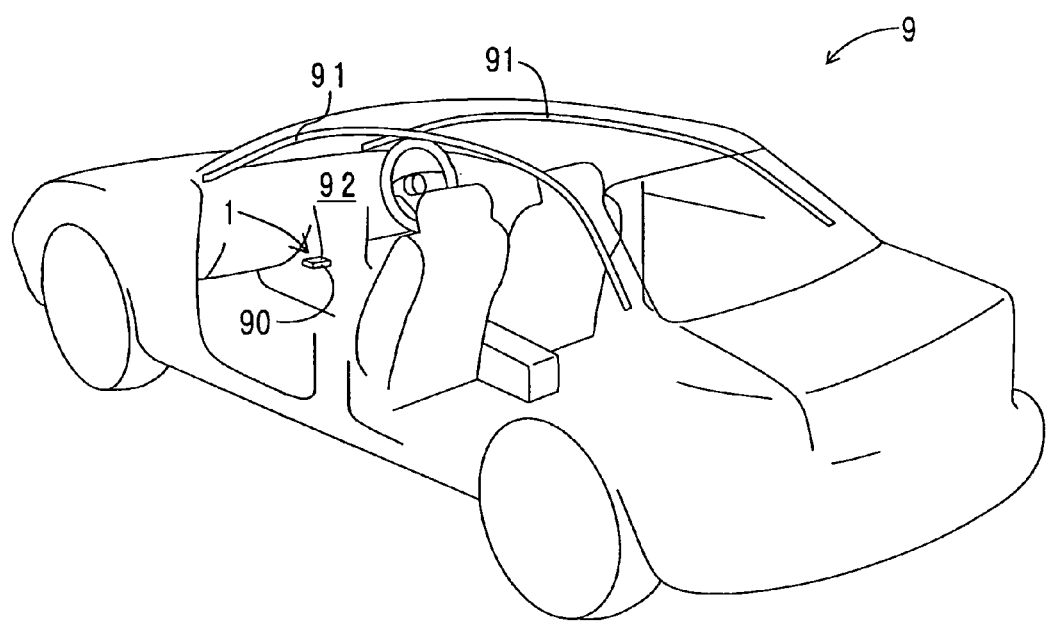
FIG. 1 is a diagram showing the arrangement of a rollover judging device according to an embodiment of the present invention.

FIG. 1 is a diagram showing the arrangement of the rollover judging device of this embodiment. As shown in FIG. 1, an air bag ECU (Electronic Control Unit) 90 and a pair of curtain air bag devices 91 are disposed in a vehicle body 9. The air bag ECU 90 is embedded at the lower side of an instrumental panel 92. A rollover judging device 1 is installed in the air bag ECU 90. The curtain air bag devices 91 are disposed along both the edges of the ceiling in the vehicle running direction.

Figure 2:
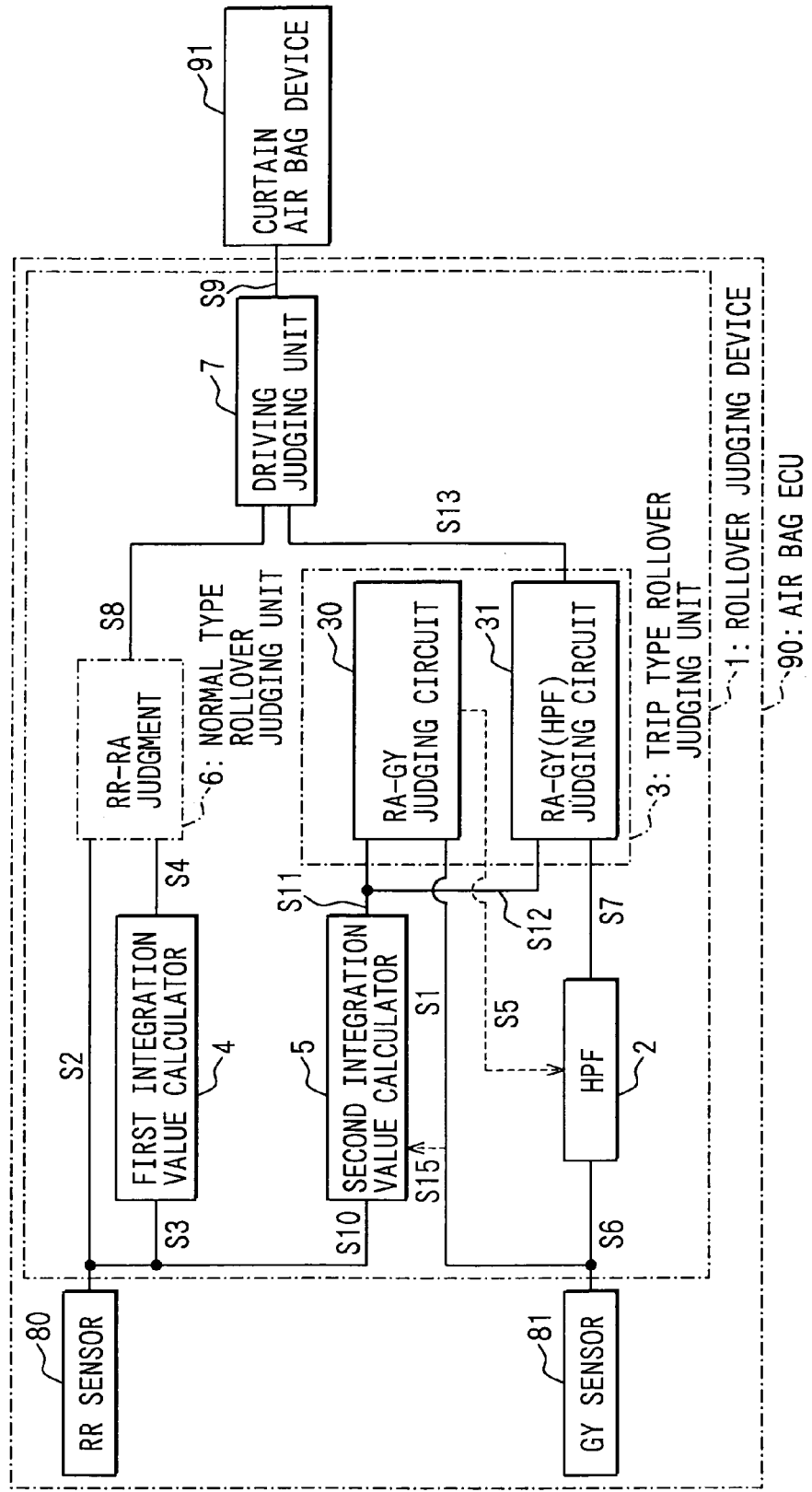
FIG. 2 is a block diagram showing the rollover judging device of the embodiment.

FIG. 2 is a block diagram showing the rollover judging device according to the embodiment. As shown in FIG. 2, the rollover judging device 1 is equipped with HPF (high pass filter) 2, a trip type rollover judging unit 3, a first integration value calculator 4, a second integration value calculator 5, a normal type rollover judging unit 6 and a driving judging unit 7. The trip type rollover judging unit 3 is equipped with an RA-GY judging circuit 30 and an RA-GY (HPF) (acceleration differential value) judging circuit 31. The RA-GY judging circuit 30 is contained in a trip type judging circuit of the present invention. The RA-GY (HPF) judging circuit 31 is contained in a mode judging circuit of the present invention. An RR sensor 80 is connected to the normal type rollover judging unit 6, the first integration value calculator 4 and the second integration value calculator 5. A GY sensor 81 is connected to HPF 2 and the RA-GY judging circuit 30.

Figure 3A:
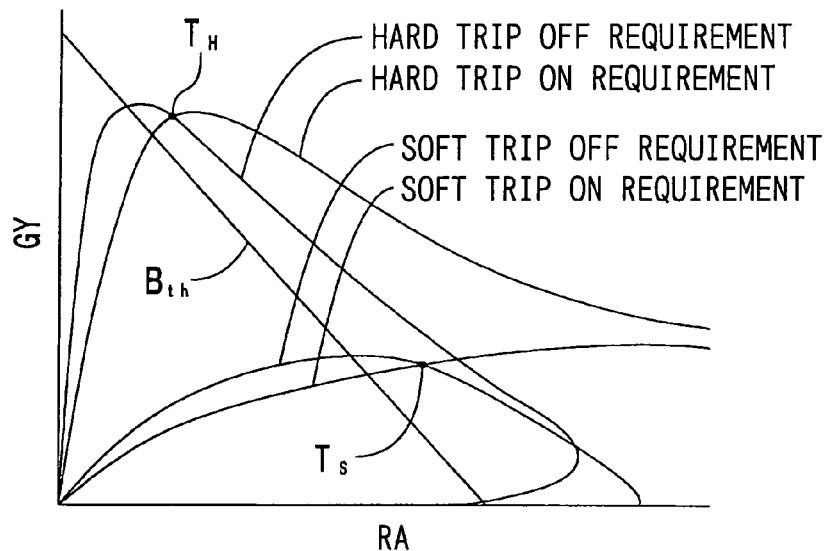
FIG. 3A is a diagram showing a RA-GY map.

FIG. 3A shows an RA-GY map. A hard trip OFF requirement indicates data when a vehicle hard-trips, but will not rollover. A hard trip ON requirement indicates data when a vehicle hard-trips and thus will rollover. A soft trip OFF requirement indicates data when a vehicle soft-trips and thus will not rollover. A soft trip ON requirement indicates data when a vehicle soft-trips, but will rollover.

The RA-GY map is used to judge in the RA-GY judging circuit 30 whether the rollover type is a trip type or not. Here, when the vehicle only sideslips, only GY occurs. On the other hand, when the vehicle rolls over in a normal rollover type, only RA occurs. Accordingly, as shown in FIG. 3A, when both GY and RA occur, it can be judged that the rollover type is the trip type.

In FIG. 3A, a line $B_{th}$ is a threshold value for specifying a start point to start the calculation of the acceleration differential value. The threshold value $B_{th}$ is set so that the development space of the curtain air bag devices 91 can be secured between the heads of passengers and the interior of the vehicle. The response required time $T_H$ of the hard trip and the response required time $T_S$ of the soft trip are set in an area where the roll of the vehicle exceeds a threshold value $B_{th}$ (the upper right area of FIG. 3A).

Accordingly, at the roll time, the vehicle first exceeds the threshold value $B_{th}$, and then exceeds the response required time $T_H$, $T_S$. Therefore, the rollover judgment can be apparently performed within the response required time $T_H$, $T_S$. However, the data of the hard trip OFF requirement and the soft trip OFF requirement are also located in even an area beyond the threshold value $B_{th}$. Accordingly, it is difficult to make a rollover judgment within the response required time $T_H$ of the hard trip or within the response required time $T_S$ of the soft trip on the basis of only the RA-GY map.

Figure 3B:
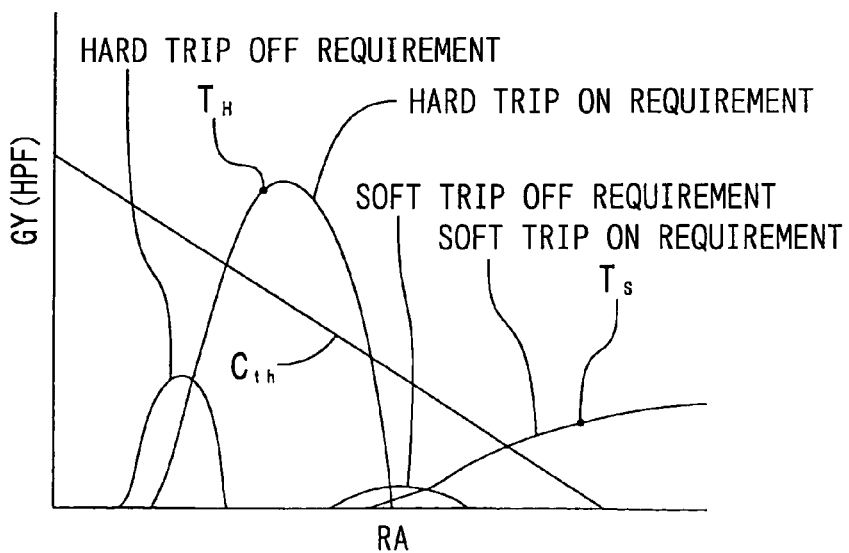
FIG. 3B is a diagram showing a RA-GY (HPF) map.

FIG. 3B shows an RA-GY (HPF) map. The RA-GY (HPF) map is used in the RA-GY (HPF) judging circuit 31 to judge whether the mode of the trip type is the hard trip or the soft trip and whether the vehicle will roll over in each mode. This map is achieved by differentiating GY subsequent to the threshold value $B_{th}$ in FIG. 3A by HPF 2.

The rollover judgment threshold value $C_{th}$ is set so that both the hard trip ON requirement and the hard trip OFF requirement and both the soft trip ON requirement and the soft trip OFF requirement are respectively separated from each other through the rollover judgment threshold value $C_{th}$. Furthermore, the response required time $T_H$ of the hard trip and the response required time $T_S$ of the soft trip are set in an area (the upper right area in FIG. 3B) where the roll of the vehicle exceeds the rollover judgment threshold value $C_{th}$.

Accordingly, at the roll time, the vehicle first exceeds the rollover judgment threshold value $C_{th}$, and then exceeds the response required time $T_H$, $T_S$. In addition, no data of the hard trip OFF requirement and the soft trip OFF requirement exist in the area exceeding the rollover judgment threshold value $C_{th}$ (the upper right area in FIG. 3B). Accordingly, the rollover judgment can be performed within the response required time $T_H$ of the hard trip or within the response required time $T_S$ of the soft trip on the basis of this map.

Next, the operation of the rollover judging device according to this embodiment when the vehicle rolls over will be described.

Figure 5:
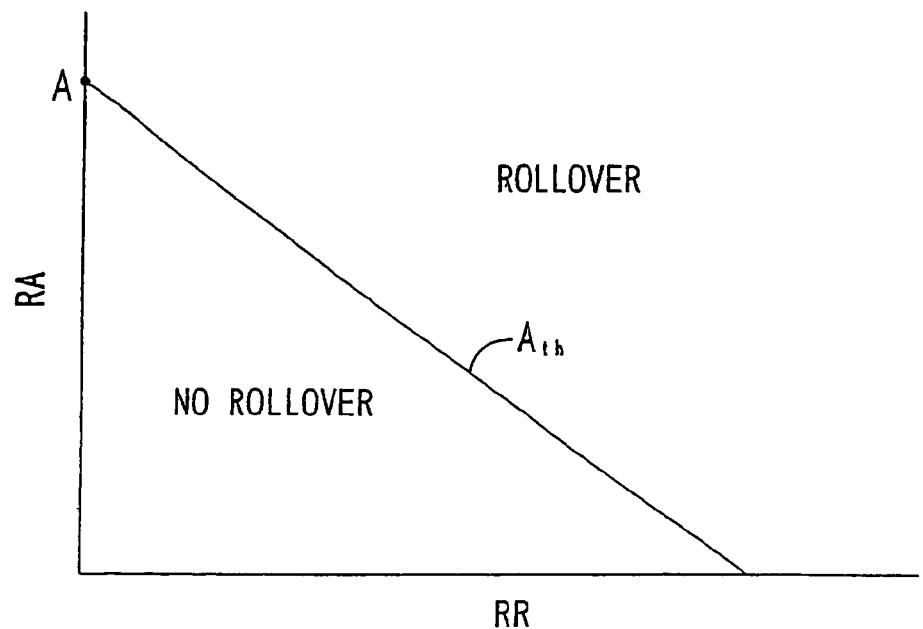
FIG. 5 is a diagram showing an RR-RA map of a conventional rollover judgment.
Figure 6:
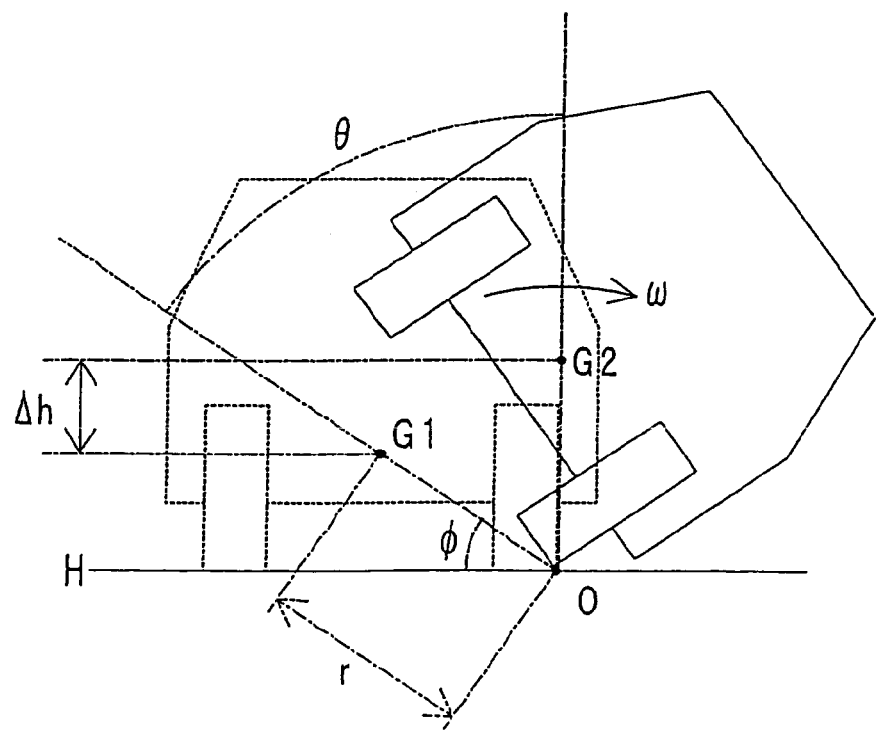
FIG. 6 is a schematic diagram when a vehicle rolls.

As shown in FIG. 2, the RR sensor 80 detects a roll rate (RR). The roll rate (RR) thus detected is transmitted through a signal line s2 to the normal type rollover judging unit 6. RR is also transmitted through a signal line s3 to the first integration value calculator 4. A roll angle (RA) is calculated from RR by the first integration value calculator 4. RA thus calculated is transmitted through a signal line s4 to the normal type rollover judging unit 6. In the normal type rollover judging unit 6, the rollover judgment is carried out by using the RR-RA map (see FIG. 5). When it is judged as a result of the rollover judgment that the vehicle will rollover, a driving signal is transmitted through a signal line s8 to the driving judging unit 7. Upon receiving the driving signal, the driving judging unit 7 outputs a driving instruction through a signal line s9 to the curtain air bag devices 91.

The GY sensor 81 detects GY (acceleration of the vehicle in the lateral direction). GY detected is transmitted through a signal line s1 to the RA-GY judging circuit 30. The RR sensor 80 is also connected through a signal line s10 to the second integration value calculator 5. Therefore, RR detected is also transmitted to the second integration calculator 5. RR is integrated in the second integration value calculator 5 to calculate RA. Switching of an attenuation coefficient is carried out through a signal line s15. RA thus calculated is transmitted through a signal line s11 to the RA-GY judging circuit 30. In the RA-GY judging circuit 30, it is judged by using the RA-GY map (see FIG. 3A) whether the rollover type is the trip type or not.

If the rollover type is the trip type, the RA-GY judging circuit 30 outputs a calculation starting instruction to HPF 2 through a signal line s5. Specifically, the time constant of HPF 2 is switched. HPF 2 differentiates GY input from the GY sensor 81 through a signal line s6 to calculate an acceleration differential value. The acceleration differential value thus calculated is transmitted through a signal line s7 to the RA-GY (HPF) judging circuit 31. RA is input from the second integration value calculator 5 through a signal line s12 to the RA-GY (HPF) judging circuit 31. In the RA-GY (HPF) judging circuit 31, it is judged by using the RA-GY (HPF) map (see FIG. 3B) whether the mode of the trip type is the hard trip or the soft trip.

Furthermore, it is also judged in accordance with each mode whether the vehicle will rollover or not. When it is judged as a result of the rollover judgment that the vehicle will rollover, a driving signal is transmitted through a signal line s13 to the driving judging unit 7. Upon receiving the driving signal, the driving judging unit 7 outputs a driving instruction to the curtain air bag devices 91 through the signal line s9.

Next, an effect of the rollover judging device of this embodiment will be described.

According to the rollover judging device 1 of this embodiment, the rollover judgment is carried out on the basis of the RA-GY (HPF) map (see FIG. 3B). In other words, the rollover judgment is carried out on the basis of the acceleration differential value. Therefore, the rollover judgment can be carried out within the response required time $T_H$ of the hard trip or within the response required time $T_S$ of the soft trip. Furthermore, the rollover judgment can be carried out in conformity with the mode of the trip type by the RA-GY judging circuit 30 and the RA-GY (HPF) judging circuit 31.

According to the rollover judging device of this embodiment, HPF 2 starts the differentiation of GY after passing over the threshold value $B_{th}$ in the RA-GY map (see FIG. 3A). That is, in the case of the hard trip, the differentiation of GY is started under the condition that both of small RA and high GY are satisfied. Furthermore, in the case of the soft trip, the differentiation of GY is started under the condition that large RA and low GY are satisfied. Therefore, it is not required to successively continue the calculation of the acceleration differentiation value.

The rollover judging device 1 of this embodiment is equipped with the normal type rollover judging unit 6. Therefore, when the rollover type is the normal type, the rollover judgment can be made by the normal type rollover judging unit 6. On the other hand, when the rollover type is the trip type, the rollover judgment can be made by the trip type rollover judging unit 3. Therefore, the rollover judgment can be performed with high precision in conformity with the rollover type.

Second Embodiment

The different points between this embodiment and first embodiment reside in that the rollover judgment of the normal type rollover judging unit and the rollover judgment of the trip type rollover judging unit are subjected to AND processing, and also in that the threshold value for judging the rollover judgment in the normal type rollover judging unit is changed by the trip type rollover judging unit. Accordingly, only the different points will be described hereunder.

Figure 4:
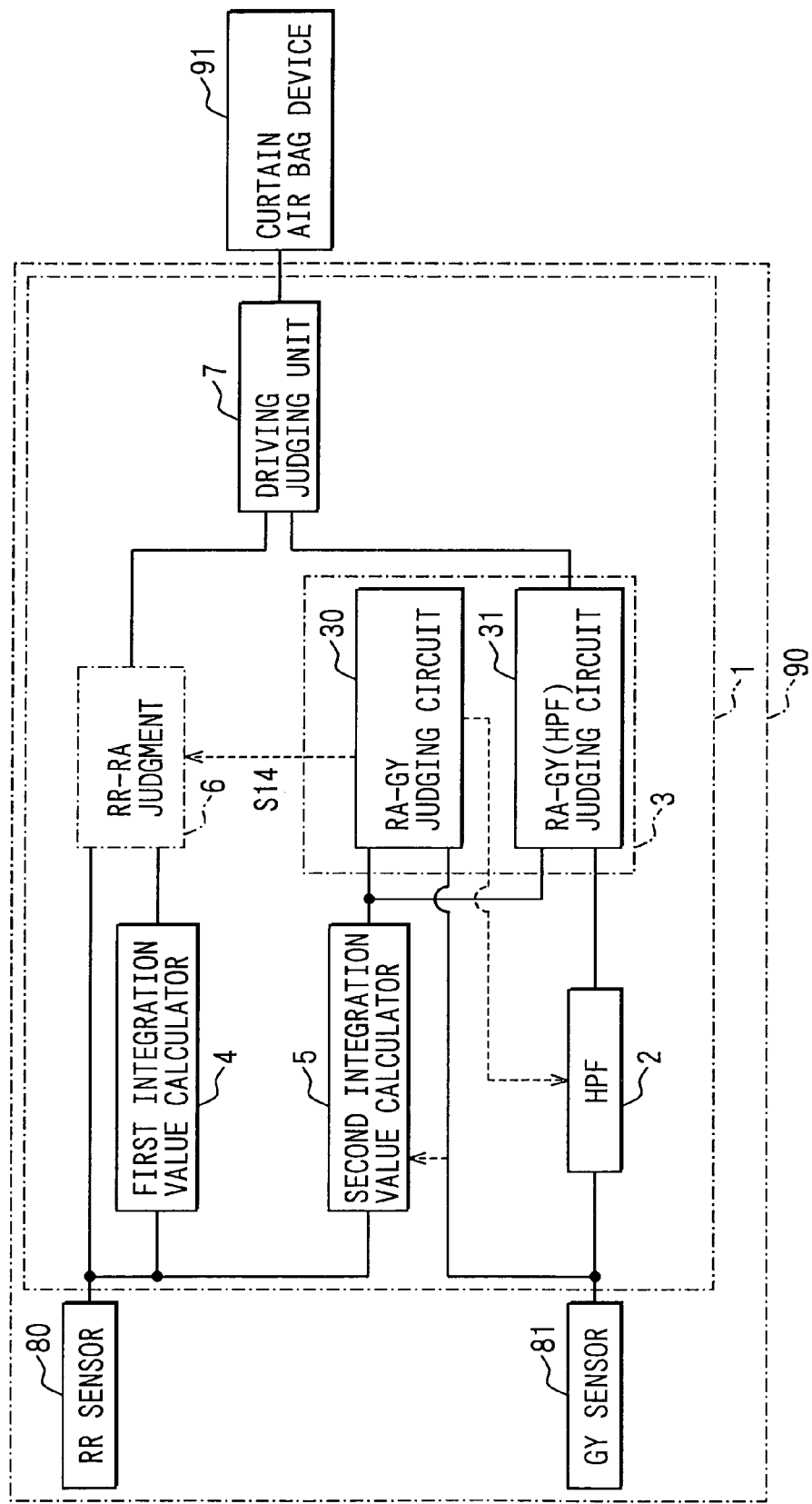
FIG. 4 is a block diagram showing a rollover judging device according to a second embodiment of the present invention.

FIG. 4 is a block diagram showing a rollover judging device according to this embodiment. The corresponding parts to those of FIG. 2 are represented by the same reference numerals. As shown in FIG. 4, the RA-GY judging circuit 30 and the normal type rollover judging unit 6 are connected to each other through a signal line s14. When the RA-GY judging circuit 30 judges that the rollover type is the trip type, it outputs through the signal line s14 an instruction for sliding the dynamic rollover limit threshold value $A_{th}$ to the lower left side in FIG. 5. The driving judging unit 7 outputs a driving instruction to the curtain air bag devices 91 only when both the driving signal from the normal type rollover judging unit 6 and the driving signal from the RA-GY (HPF) judging circuit 31 are input to the driving judging unit 7.

The rollover judging device 1 of this embodiment has the same effect as the rollover judging device of the first embodiment. Furthermore, according to the rollover judging device 1 of this embodiment, the dynamic rollover limit threshold value $A_{th}$ is slid to the lower left side in FIG. 5, and thus the rollover judgment can be performed at a stage that RA and RR are small. The driving signal from the normal type rollover judging unit 6 and the driving signal from the RA-GY (HPF) judging circuit 31 are subjected to AND processing, and thus malfunction of the curtain air bag devices 91 can be suppressed.

<Further Modifications>

The embodiments of the rollover judging device 1 of the present invention have been described above. However, the present invention is not limited to the above embodiments, and various modifications and improvements may be made within the technical range which is obvious to persons skilled in the art. For example, in the above embodiments, HPF is used for the calculation of the acceleration differential value, however, a differential calculator may be used. Furthermore, a speed calculator for calculating the speed from GY may be disposed. The rollover judgment may be carried out by using the acceleration in the vertical direction of the vehicle. The positions of the RR sensor 80 and the GY sensor 18 are not limited to specific positions, and both the sensors may be placed on the same plane.

What is claimed is:

1. A rollover judging device for a vehicle comprising:
a differential value calculating unit for differentiating an acceleration of the vehicle in the lateral direction to calculate an acceleration differential value; and
a trip-type rollover judging unit for making a rollover judgment on the basis of a roll angle achieved by integrating a roll rate and the acceleration differential value, so that a possible trip-over of the vehicle, in which the vehicle rolls over after the vehicle sideslips, can be judged, when each of the roll angle and the acceleration differential value exceeds respectively predetermined values.

2. A rollover judging device according to claim 1, wherein the trip-type rollover judging unit comprises:
a trip type judging circuit for judging whether the rollover type of the vehicle is the trip type, on the basis of at least one of the roll rate and the roll angle and at least one of the acceleration and the acceleration differential value; and
a mode judging circuit for making a rollover judgment in conformity with the mode of the trip type, on the basis of at least one of the roll rate and the roll angle and the acceleration differential value.

3. A rollover judging device according to claim 2, wherein the trip-type rollover judging unit further comprises:
a speed calculating unit for integrating the acceleration to calculate a speed.

4. A rollover judging device according to claim 2, wherein the differential value calculating unit starts the calculation of the acceleration differential value, after the trip type judging circuit judges the trip type.

5. A rollover judging device according to claim 1, wherein the differential value calculating unit is constructed by one of a high pass filter and a differential calculator.

6. A rollover judging device according to claim 1, further comprising:
a normal type rollover judging unit for making a rollover judgment on the basis of a roll rate and a roll angle of the vehicle.

7. A rollover judging device according to claim 6, wherein the rollover judgment of the normal type rollover judging unit and the rollover judgment of the trip type rollover judging unit is subjected to AND processing.

8. A rollover judging device according to claim 6, wherein a judgment threshold value for the rollover judgment of the normal type rollover judging unit is changed by the trip type rollover judging unit.

9. A rollover judging device according to claim 1, wherein the trip type rollover judging unit makes a rollover judgment by using an acceleration in the vertical direction of the vehicle.

10. A rollover judging device according to claim 1, wherein
the trip-over of the vehicle in a hard trip mode and the trip-over of the vehicle in a soft trip mode can be respectively judged by comparing the roll angle and the acceleration differential value with the predetermined values.

11. A rollover judging device for a vehicle comprising:
a normal type rollover judging unit for making a rollover judgment on the basis of a roll rate and a roll angle of the vehicle;
a trip type judging circuit for judging whether the rollover type of the vehicle is the trip type, on the basis of the roll angle and an acceleration of the vehicle in a lateral direction;
a differential value calculating unit for calculating an acceleration differential value from the acceleration of the vehicle in the lateral direction; and
a mode judging circuit for making a rollover judgment in conformity with the mode of the trip type, on the basis of the roll angle and the acceleration differential value, so that a possible trip-over of the vehicle, in which the vehicle rolls over after the vehicle sideslips, can be judged, when each of the roll angle and the acceleration differential value exceeds respectively predetermined values.

12. A rollover judging device according to claim 11, wherein
the differential value calculating unit starts the calculation of the acceleration differential value, after the trip type judging circuit judges the trip type.

13. A rollover judging device according to claim 11, wherein
the trip type judging circuit outputs a signal to the differential value calculating unit, when the acceleration of the vehicle in the lateral direction is higher than a predetermined value corresponding to the respective roll angle of the vehicle, so that the differential value calculating unit starts the calculation of the acceleration differential value.

14. A rollover judging device according to claim 11, wherein
the rollover judgment of the normal type rollover judging unit and the rollover judgment of the trip type rollover judging unit is subjected to AND processing.

15. A rollover judging device according to claim 11, wherein
a judgment threshold value for the rollover judgment of the normal type rollover judging unit is changed by the trip type rollover judging unit.

16. A rollover judging device according to claim 11, wherein
the mode judging circuit judges the possible trip-over of the vehicle, when the acceleration differential value exceeds a predetermined value corresponding to the respective roll angle of the vehicle.

17. A rollover judging device according to claim 11, wherein
the trip-over of the vehicle in a hard trip mode and the trip-over of the vehicle in a soft trip mode can be respectively judged by comparing the roll angle and the acceleration differential value with the predetermined values.

* * * * *